United States Patent
Nakaguchi et al.

[15] 3,669,945
[45] June 13, 1972

[54] PROCESS FOR PRODUCING A HOMOPOLYMER OR COPOLYMER OF ETHYLENE WITH NOVEL CATALYST

[72] Inventors: Kohei Nakaguchi, Kobe; Tomozumi Nishikida, Itami-shi; Shohachi Kawasumi; Kenichi Maemoto, both of Takatsuki-shi; Takezo Sano, Ibaraki-shi; Yoshikazu Fujii, Takatsuki-shi; Koichi Harada, Ibaraki-shi; Keijyu Ueda, Niihama-shi, all of Japan

[73] Assignee: Sumitomo Chemical Company, Ltd., Osaka, Japan

[22] Filed: March 6, 1967

[21] Appl. No.: 620,615

[30] Foreign Application Priority Data

March 8, 1966 Japan.................................41/14524

[52] U.S. Cl. ................260/85.3 R, 260/88.2 D, 260/88.2 R, 260/94.9 CB, 260/94.9 CD, 252/429 B, 252/431 P
[51] Int. Cl. ......................................................C08f 15/04
[58] Field of Search.............260/94.9 C, 88.2, 80.78, 85.3 R; 252/429 B, 431 P

[56] References Cited

UNITED STATES PATENTS

| | | | |
|---|---|---|---|
| 3,427,257 | 2/1969 | Bayer | 252/431 |
| 3,488,334 | 1/1970 | Bayer | 260/88.2 |
| 3,365,405 | 1/1968 | Fukui et al. | 260/2 |

OTHER PUBLICATIONS

Kigiya et al., Chem Abs. 6,931b Vol. 60, 1964 (Polymerization of Olefins by Catalysts of Metal Phosphates) Kogyo Kagaku Zasshi 66(b), 841–6 1963
Fukui et al., Chem Abs. 16,002h, Vol. 60, 1964 (Catalyst for Polymerization of Olefins,) Japan 7,133 (63) May 27.
Kagiya et al., Chem Abs., 10,071h– 10,072a to e, Vol. 63, 1965 (Polymerization of Ethylene Oxide) Kyoto Daigaku Nippon Kagaku Seni Kenkyusho Koenshu, 20, 19– 36 1963
Sumitomo, Chem. Abs. 3,724f, Vol. 64, 1966

*Primary Examiner*—Joseph L. Schofer
*Assistant Examiner*—Roger S. Benjamin
*Attorney*—Stevens, Davis, Miller & Mosher

[57] ABSTRACT

A process for the homopolymerization and copolymerization of ethylene using a catalyst composed of (1) a substance obtained by treating with an alcohol a reaction product of a vanadium compound and a phosphoric acid or its derivative, or a mixture thereof and (2) an organo-aluminum compound having the composition formula,

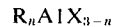

wherein R is a hydrocarbon group having one to eight carbon atoms; X is a group selected from halogen, alkoxy group and hydrogen; and $n$ is a positive number not more than 3.

18 Claims, No Drawings

PROCESS FOR PRODUCING A HOMOPOLYMER OR COPOLYMER OF ETHYLENE WITH NOVEL CATALYST

Solid high polymers of ethylene have excellent physical and chemical properties and hence have widely been utilized and are valuable in practical use when processed into molded articles, films, sheets and fibers. Further, copolymers thereof with other olefins such as propylene have been highly evaluated as elastomers.

As methods for producing high polymers of ethylene, there have heretofore been known a high pressure polymerization process using a radical initiator, a low pressure polymerization process using a catalyst comprising a reaction product of a transition metal halide and an organo-metallic compound, and a medium pressure polymerization process using as main catalyst component a transition metal oxide supported on a carrier. These processes have excellent characteristics, respectively. For example, according to the high pressure polymerization process, the resulting polyethylene is rich in branches, low in density and soft. In accordance with the low pressure polymerization process, which is famous as the Ziegler process, the polymerization reaction can be effected under a low pressure in the vicinity of normal pressure, and the resulting polyethylene is less in branch, high in density and rigid. Further, according to the medium pressure polymerization process, which was developed by Phillips Petroleum Co. and Standard Oil Co., respectively, the catalyst has a long life and less variation in activity during polymerization, and the resulting polyethylene has the most straight chain and the highest density. On the other hand, these processes suffer from more or less drawbacks. For example, in the high pressure polymerization process, the polymerization reaction is effected under a high pressure more than 1,000 atm., with the result that the reaction apparatus is necessarily required to be highly pressure-resistant and a danger is accompanied. Further, the resulting polyethylene is low in density and is not suitable for uses where rigidity and mechanical strength are required. In the low pressure polymerization process, a catalyst prepared by mixing titanium tetrachloride with an alkylaluminum compound is deemed to be most effective. It is said, however, that not only the catalyst is markedly variable in activity depending on the mixing conditions and mixing procedures of the catalyst components but the catalyst activity greatly varies during the reaction and the catalyst life is relatively short. On the other hand, typical catalysts employed in the medium pressure polymerization process are a molybdenum oxide-alumina catalyst (Japanese Patent Publication No. 5,746/1957) and a chromium oxide-silica alumina catalyst (Japanese Patent Publication No. 987/1957). Although these catalysts well maintain their activities, they are low in catalyst activity as compared with those employed in the low pressure process, and are insoluble and therefore the removal of the catalysts is not easy. Accordingly, all the existing methods have paid special considerations to apparatus or steps. Such a matter is considered to be not always easy and economical.

Japanese Patent Publication No. 7,133/1963 discloses a method for polymerizing olefins using as catalyst a mixed system comprising vanadyl orthophosphate and a hydride or organo-metallic compound of a metal of Groups I to III of the Periodic Table. In said method, however, the catalytic activity is low and, in the polymerization of ethylene, for example, the amount of polymer obtained for 3 hours is not more than 10 times the amount of vanadyl orthophosphate used, as is clear from Examples 1 and 2 of the Specification.

As the result of repeated studies made in order to overcome such drawbacks in the conventional processes, the present inventors have been successful in developing novel catalysts characterized with high activity, long life and stability to attain the process of the present invention.

This invention relates to a process for producing solid high polymers of ethylene by polymerizing ethylene either alone or together with other unsaturated hydrocarbons, and particularly to catalysts having excellent efficiencies which are to be used therefor.

An object of the present invention is to provide a method for producing polyethylene which has overcome the drawbacks of the conventional processes. This object has come to be achieved by the discovery of catalysts which are not only usable under low reaction pressures but have high activities equal to those of the low pressure process catalysts and further have a long life and stability comparable to those of the medium pressure process catalysts.

Another object of the present invention is to provide an easy and commercially practicable process which not only achieves the above-mentioned object but gives a polymer having an average molecular weight of a wide range.

The process of the present invention is characterized in that ethylene, either alone or together with other unsaturated hydrocarbon, is contacted in the presence or absence of hydrogen with a catalyst comprising (1) a substance prepared by treating with alcohol a product obtained by reacting a vanadium compound with a phosphoric acid or its derivative or with a mixture of phosphoric acid and its derivative, and (2) a substance having the composition formula,

$$R_n AlX_{3-n}$$

wherein R is a hydrocarbon group having one to eight carbon atoms; X is a group selected from halogen, alkoxy group and hydrogen; and $n$ is a positive number not more than 3, including the case where the said latter substance is a mixture of an organo-aluminum compound and an aluminum halide.

The catalyst employed in the present invention is composed of the above-mentioned 2 components. For convenience, the vanadium-containing component will be referred to as the first component and the organo-aluminum compound-containing component as the second component, and the two components will be explained in detail hereinbelow.

The first component is an unknown substance, and the present inventors have found that said substance is a markedly effective catalyst component. An intermediary material for the first component (said material will be referred to as the intermediary material hereinafter) is a product obtained by reaction of a vanadium compound with phosphoric acid and/or its derivative. This product is presumed to have a structure formed by the dehydration condensation of vanadic acid and phosphoric acid, but the accurate chemical structure or solid structure thereof has not been confirmed yet. As such product, there is used, in most cases, one in which the atomic ratio of V to P is close to 1:1. However, one having said ratio in the range of 2:1–1:2 or in a broader range can also be prepared, depending on the preparation conditions, and is usable as the intermediary material.

As the vanadium compound, which is one component of the primary starting materials for synthesizing the intermediary material, there may be used oxides, halides, oxyhalides, sulfate and oxysulfate of vanadium and various salts such as sodium salt and ammonium salt of vanadic acid, and esters thereof with alcohols. As the phosphoric acid and its derivative, which are the other components of the primary starting materials, there may be used various phosphoric acids such as orthophosphoric acid, pyrophosphoric acid, metaphosphoric acid, polyphosphoric acid, phosphoric anhydride and mixtures thereof, salts thereof, and esters thereof with alcohols.

The synthesis reaction of the intermediary material is mostly effected in the presence of water and/or an alcohol. In this case, it is desirable that the reaction be effected while controlling the primary starting material concentration, hydrogen ion concentration, mole ratio of the two components, reaction temperature and reaction time. However, the above reaction can also be effected in the absence of water or alcohol. For example, it is possible to carry out the reaction of vanadium oxide with phosphoric acid and/or phosphoric anhydride, or the reaction of ammonium vanadate with ammonium phosphate. In these cases, it is desirable, in most cases, to effect the reactions at elevated temperatures of 100° C. or above.

The intermediary material is obtained in the solid state. The material, however, is not required to be particularly purified and may be used as such, i.e. in a state incorporated with more or less amounts of the primary starting materials and reaction medium. It is, however, necessary that the material contains a considerable amount of V—O—P linkage-containing reaction product. There are some cases where favorable results are attained when the material is heat-treated or freed from medium by drying under reduced pressure, but these are not inevitable conditions. Even when the thus obtained intermediary material is combined with an organo-aluminum compound, it is possible to form a catalyst having an olefin polymerization action (Japanese Patent Publication No. 7,133/1963). However, the activity of such catalyst is not always satisfactory.

The first component of the catalyst employed in the process of the present invention is prepared by treating said intermediary material with an alcohol. That is, an alcohol is added to the intermediary material, and the mixture is heated, if necessary. In case the by-products having lower boiling point (e.g. water) have been formed by the above treatment, it is effective to remove them continuously. As the continuous removal procedure, there is adopted azeotropic distillation or repeated treatment with fresh alcohol.

When the conditions are suitably selected, it is possible to synthesize the first component at one step by reacting the primary starting materials and an alcohol, without the isolation of the intermediary material. That is, the primary starting materials, i.e., vanadium compound, and phosphoric acid and/or its derivative and an alcohol are reacted under suitable conditions, whereby the aforesaid two procedures can be effected at one step.

As the alcohols for the above treatment, it is possible to use all of the ordinary hydroxy compounds belonging to aliphatic, alicyclic, and aromatic alcohols and phenols. These may be not only monohydroxy but also polyhydroxy compounds, and may be used in admixture of two or more. Further, alcohols containing other functional groups than hydroxy groups in the molecules may also be used in some cases. Typical alcohols include methyl alcohol, ethyl alcohol, n-propyl alcohol, i-propyl alcohol, allyl alcohol, n-butyl alcohol, i-butyl alcohol, sec-butyl alcohol, t-butyl alcohol, n-amyl alcohol, i-amyl alcohol, n-hexyl alcohol, n-heptyl alcohol, n-octyl alcohol, i-octyl alcohol, 2-ethylhexyl alcohol, n-nonyl alcohol, n-decyl alcohol, n-dodecyl alcohol, cetyl alcohol, oleyl alcohol, ethylene glycol, 1,2-propylene glycol, 1,3-propylene glycol, 1,4-butylene glycol, 1,6-hexamethylene glycol, glycerol, ethylene glycol monomethyl ether, diethylene glycol monomethyl ether, cyclohexyl alcohol, benzyl alcohol, phenylethyl alcohol, furfuryl alcohol, phenol, cresol, catechol, resorcinol, hydroquinone and pyrogallol.

The above-mentioned alcohol treatment may be effected either in the presence or absence of medium. Usable mediums are hydrocarbons, halogenated hydrocarbons, ethers, ketones and esters. When the medium is used, the by-products having lower boiling point (e.g. water) formed in the reaction can be readily removed according to azeotropic distillation process and the temperature can also be controlled at the boiling point of the medium employed, whereby the object of activation by the alcohol treatment can be easily achieved in most cases. Examples of the medium employed are benzene, toluene, xylene, hexane, heptane, cyclohexane, acetone, methylethylketone, ethyl acetate, dioxane, tetrahydrofuran, diethyl ether, dipropyl ether, ethylene glycol dimethyl ether, carbon tetrachloride and butyl bromide.

Treating conditions employed in the alcohol treatment depend on the nature of intermediary material and alcohol, the presence of absence of medium and the nature of medium. However, a treating temperature in the range of from 0° C. up to 250° C., and a treating time in the range from 10 minutes to 100 hours, particularly from 30 minutes to 50 hours are frequently adopted. The adoption of a high temperature of 250° C. or above and a long time of 100 hours or more tends to bring about the secondary denaturation of catalyst components.

The amount of alcohol employed is 0.1–1,000 parts, preferably 1–200 parts, by weight per part by weight of the intermediary material.

After completion of the alcohol treatment, the first component formed can be recovered by various processes, e.g. (i) by removing volatiles from the treated mixture and drying up the residue or (ii) by subjecting the treated mixture to filtration or centrifuge to divide the same into a solid portion and a solution portion and removing volatiles from said portions respectively. In the process (ii), each yield of the first components obtained from the solid portion and solution portion depends on the conditions of alcohol treatment of the intermediary material. The recovery of the first component from the solution portion may be effected by merely drying said portion. However, when water is added to the solution portion, a major proportion of first component can be precipitated. It is needless to say that the precipitation can also be effected by addition of a non-solvent such as a hydrocarbon to the solution portion. In case the solution portion is dried after incorporation of a carrier such as a metal oxide, the first component supported on carrier can easily be obtained. The appearance of the first component obtained and the efficiencies thereof as a catalyst component more or less depend on the process of recovery. In any case, however, the resulting first component is high in activity and satisfies the object of the present invention.

The thus obtained first component is a relatively stable substance, but is desirably stored in a dark place free from oxygen and humidity, in order to prevent the same from denaturation.

There are many cases where the first component differs in color from the intermediary material and has more increased in weight than the intermediary material. This signifies the fact that alcohol or a reaction product of alcohol and intermediary material has chemically or physically combined with the intermediary material.

As will be understood from the above-mentioned preparation process, the first component of the catalyst of the present invention is a substance which cannot be expressed by a stoichiometrically distinct chemical formula. It is inferred that the first component is not a single compound having a definite molecular weight but is a substance composed of compounds different in molecular weight, in amount of combined alcohol and in average valency of vanadium.

During the alcohol treatment, there is ordinarily observed the phenomenon that water is by-produced. This water is considered to be ascribable to water contained in the intermediary material, water released in condensation of the intermediary material and water formed by reaction of alcohol with the intermediary material.

For the preparation of the first component, there may be thought of various processes in addition to the aforesaid processes. For example, a supported first component can be obtained by applying the alcohol treatment to the intermediary material supported on a carrier.

As the second component, there may be used an organo-aluminum compound having at least one carbon-aluminum bond or a mixture of said organo-aluminum compound and an aluminum halide. The second component is represented by the composition formula, $$R_nAlX_{3-n}$$

wherein R, X and $n$ have the same meanings as identified above.

As the organo-aluminum compounds, there are used trialkylaluminums, triarylaluminums, dialkylaluminum halides, dialkylaluminum hydrides, dialkylaluminum alkoxides, diarylaluminum halides, alkylaluminum sesquihalides, alkylaluminum dihalides and arylaluminum dihalides. Typical examples of these compounds are trimethylaluminum, triethylaluminum, triisobutylaluminum, trihexylaluminum, trioctylaluminum, diethylaluminum chloride, diisobutylaluminum chloride, diisobutylaluminum bromide, diethylaluminum iodide, diphenylaluminum chloride, ethylaluminum sesquichloride, ethylaluminum dichloride, isobutylaluminum dichloride, diethylaluminum hydride, diisobutylaluminum hydride and diethylaluminum ethoxide.

In place of using these organo-aluminums in pure form as the second components, raw materials therefor may be added to the reaction systems so that the second components are formed in the systems.

As the second components, there are also used mixtures of organo-aluminum compounds and aluminum halides, e.g., mixtures of trialkylaluminums and aluminum halides. It is, of course, possible to use mixtures of various organo-aluminum halides and aluminum halides or trialkylaluminums. As the aluminum halides, there are used aluminum fluoride, aluminum chloride, aluminum bromide and aluminum iodide.

The polymerization reaction may be effected in the absence of solvent, but is preferably carried out in the presence thereof. As the solvents, there are frequently used aliphatic, alicyclic and aromatic hydrocarbons and halogenated hydrocarbons such as, for example, propane, butane, pentane, hexane, heptane, octane, cyclohexane, methylcyclohexane, benzene, toluene, xylene, tetraline, decaline, monochlorobenzene and tetrachloroethylene.

These solvents may be used either singly or in admixture of two or more. Petroleum fractions such as, for example, petroleum ether, ligroin, kerosene and naphtha may also be used. It is desirable that by suitable physical or chemical treatment, the solvents have previously been freed to less than permissible amount from polar impurities which might inactivate the catalysts.

The amount of each catalyst component employed is decided depending on the amount of solvent used, reaction temperature and reaction pressure. Preferably, however, the amount of the first component is 0.001–10 parts by weight per 1,000 parts by weight of solvent and the amount of the second component is about 0.01–100 parts by weight per 1,000 parts by weight of solvent.

The catalyst employed in the present process is composed of the above-mentioned two components. However, the catalyst can be improved in activity by further incorporation, within a range not exceeding the moles of the second component, a third component selected from the group consisting of alcohols, ethers, amines, amides, alkali metal and alkaline earth metal halides, halides of metals of Group IIA of the Periodic Table, and hydrides of alkali metals, of alkaline earth metals and of aluminum.

The polymerization reaction conditions are selected in consideration of catalyst concentration, shape of reactor and type of reaction. The reaction temperature is ordinarily in the range of 0°–300° C., preferably 20°–180° C. The ethylene partial pressure is 0.1–200 kg./cm.$^2$, preferably 1–100 kg./cm$^2$. In this case, an inert gas may be made present. In case a temperature of 0°–100° C. is adopted, it is preferable that the first component is suspended in a solvent. In this case, the polymerization product deposits, as the reaction proceeds, to form a slurry. At a temperature of 120°–300° C., the polymerization product dissolves in the reaction mixture, and therefore the reaction proceeds in the manner of solution polymerization. In this case, the first component may either be suspended or be supported on a carrier to effect the reaction according to the fixed bed type. The polymerization reaction can be carried out both in batchwise and continuous manners.

In accordance with the present process, not only the homopolymerization of ethylene but the copolymerization of ethylene with olefins having three or more carbon atoms, particularly 1-alkenes can be effected with ease. For example, copolymerization with propylene, butene-1, butene-2, 3-methylbutene-1, pentene-1, 4-methylbutene-1, hexene-1, octene-1 and hexadecene-1 is possible. When ethylene is copolymerized with the above-mentioned alkenes in amounts smaller than the amount of ethylene, it is possible to produce various resinous polyolefins excellent in processability and different in physical properties. These alkenes may be fed to polymerization systems in given amounts together with ethylene.

On the other hand, there have already been known a variety of catalysts for low polymerization reaction of ethylene, i.e., for ethylene oligomer formation reaction and by incorporation of this kind of catalyst into the present polymerization system, and ethylene oligomer formation reaction is caused in combination, and the resulting oligomer, such as dimer or trimer, of ethylene can be copolymerized in the same reactor with ethylene by means of the present catalyst system. It is also possible to obtain resinous copolymerization products, which when processed are cross-linkable, by copolymerizing ethylene with small amounts of aliphatic or alicyclic diolefins such as, for example, butadiene, piperylene, isoprene, hexadiene-1,4, cyclooctadiene, dicyclopentadiene and vinyl cyclohexane. Copolymerization with styrene and styrene derivatives is also possible.

The polymerization reaction is ceased after a required polymer yield has been attained. The ceasing of the polymerization reaction may be effected either by addition of a reagent inactivating the catalyst or by exclusion of unreacted monomers. The thus obtained polymer slurry contains the catalyst or catalyst residue and the solvent, but these can be separated by physical and chemical means. In case insoluble carrier or metal compound has been used with a first component, the catalyst residue may be removed by dissolving the resulting polymer at an elevated temperature in a solvent such as hydrocarbon and subjecting the mixture to centrifugation, filtration, adsorption or the like known treatment.

Depending on the uses of the product, it is of course possible to put the product into practical use without particularly removing the catalyst residue.

In accordance with the present process, it is possible to obtain ultra-high molecular weight ethylene homopolymers or copolymers, the commercial production of which has been relatively difficult according to the conventional processes. For example, those having an average molecular weight of 500,000–5,000,000 or more can be easily produced in high yields. The ultra high molecular weight polyethylenes are suitable for uses where high impact strength, abrasion resistance and corrosion resistance are particularly required. They are available as, for example, machine parts and construction materials. Provided that these ultra-high molecular weight polyethylenes have low flowability at the time of fusion, so that they are difficultly processable by means of the ordinary injection or extrusion molding machine and are mainly subjected to compression molding. However, by the use of recently improved molding machines, low melt index resins, which have heretofore been difficultly processable, are coming to be easily processable, and the ultra-high molecular weight polyethylenes are considered promising as novel plastic materials. Of course, they may be utilized, if necessary, in easily processable forms by lowering the polymerization degree according to thermal decomposition, oxidation decomposition or mechanical decomposition process.

As a practical problem, it is necessary to produce at will and with ease polyethylenes with various molecular weights. The molecular weight control can be realized by varying the polymerization conditions or by using a suitable chain transfer agent. It has been found that when the polymerization is effected in the presence of hydrogen, polymers having optional average molecular weight and melt index can be easily obtained by varying the amount of hydrogen present. The thus obtained polyethylenes having an average molecular weight of 10,000–300,000 are suitable for injection molding, blow molding, extrusion molding and powder molding.

The ethylene homopolymers obtained according to the present process have high mechanical strength such as hardness, yield stress, and tensile strength at break, like the high density polyethylenes in accordance with the conventional processes, and are higher in softening point than the high pressure process polyethylenes. Further, they have such a low brittle point as −100° C. or below and are excellent in impact resistance. It is therefore needless to say that they have a wide scope of uses as materials for general sundry goods and for industries.

As a characteristic of the ethylene homopolymer in accordance with the present process, it may be pointed out that they are small in number of double bonds and branches. That is, according to the infrared spectrum of the polymer, the number of double bonds contained in the polymer is less than 0.5, mostly about less than 0.2, per 1,000 carbon atoms, and is markedly less than in the case of polymer obtained according to the conventional process. The number of methyl groups is deemed to represent the number of branches, and according to the present process, it is possible to easily obtain a polymer containing one or less methyl group per 1,000 carbon atoms. This value can be controlled to a certain extent by selection of reaction conditions and procedures. It is, of course, easy as mentioned before to control the number of branch by copolymerization process.

An ethylene polymer relatively low in average molecular weight and markedly small in number of branch, i.e. a straight chain polymer, shows a density of about 0.960–0.970, and among the conventional ethylene polymers, it belongs to extremely high density one. A polymer, which has been increased in number of branch by copolymerization, gives a product having a density of 0.940–0.960. Generally, a polymer having relatively high average molecular weight is difficultly crystallized as compared with one having low average molecular weight, with the result that it is lowered in density. Most of the ultra-high molecular weight products show a density of 0.930–0.940.

Further, when ethylene is copolymerized with relatively large amounts of other olefins, there are obtained various copolymers different in physical properties due to introduction of large amounts of other olefin units. For example, when ethylene is copolymerized with a large amount of propylene, a low crystalline or amorphous copolymer is obtained. This copolymer is cured with peroxide or the like to give a useful rubbery substance. Further, when the above-mentioned ethylene-propylene copolymerization is effected in the presence of dienes, there are obtained sulfur-curable terpolymers which are useful as well.

The following examples illustrate the process of the present invention, but the examples are for better understanding of the intention and content of the present invention and do not limit the scope of the invention.

DESCRIPTION OF THE PREFERRED EMBODIMENTS

EXAMPLE 1

54.6 parts by weight of vanadium pentoxide was thoroughly mixed with 138.4 parts by weight of orthophosphoric acid (85 percent) in a glass vessel at room temperature, and the mixture was allowed to stand in a dark place for 3 days, whereby the whole mixture was colored to yellow. The content of the vessel was taken out and was thoroughly washed with methanol, and then a solid product was separated by filtration and was dried in a phosphorus pentoxide-containing desiccator at room temperature for 4 days under reduced pressure to obtain 107 parts by weight of a yellow solid as intermediary material.

Subsequently, the intermediary material was subjected to alcohol treatment in the following manner: A reflux condenser was connected to a 500-cc. flask, employed as a treating vessel. At the middle of the connecting pipe, a liquid reservoir of about 10 cc. in volume was provided, and to the lower part of the reservoir, a cock was attached downwardly so that a part of refluxed liquid could be withdrawn. 5.0 g. of the intermediary material, 20 g. of n-butanol and 200 cc. of benzene were charged in the flask, which was then heated in an oil bath to moderately reflux the mixture. The initial distillate contained water and, in the liquid reservoir, the reflux liquid collected to separate into 2 layers. A portion composed mainly of water formed the lower layer and therefore only the lower layer was withdrawn by opening the cock occasionally. After 4 hours, the reflux liquid came to show little layer separation, but the treatment was effected for 12 hours. After completion of the treatment, benzene and unreacted butanol were removed by distillation to obtain 5.6 g. of a greenish grey solid as product. The product was pulverized using a mortar in a dry nitrogen atmosphere and was used as the first component in the following polymerization.

0.05 g. of the first component was suspended in 100 cc. of n-heptane, and the suspension was charged in a 1,000 cc. stainless steel autoclave which was provided with an electromagnetic stirrer and was replaced with dry nitrogen. Subsequently, 300 cc. of n-heptane was charged, and stirring was initiated. Further, a solution of 0.35 g. of ethylaluminum dichloride in 50 cc. of n-heptane was charged. Finally, 50 cc. of additional n-heptane was charged. The autoclave was heated by use of an oil bath and, after the inner temperature had reached 70° C., ethylene was charged up to a pressure of 5 kg./cm$^2$. The reaction was effected for one hour while supplying ethylene so that the pressure was maintained at 5 kg./cm$^2$. After completion of the reaction, unreacted gas was purged, and then the content of the autoclave was taken out and a solid product was separated by filtration. To the solid product, a 1:1 (volume) mixture of methanol and hydrochloric acid was added in about 3 times the amount (volume) of the solid product, and the resulting mixture was heated to remove a catalyst residue. The solid was separated by filtration, was washed several times with methanol and was dried under reduced pressure at 50° C. for 10 hours to obtain 54.4 g. of polyethylene. The polyethylene had an intrinsic viscosity of 21.3 (dl./g.) when measured in xylene solvent at 120° C. using Ostwald's viscometer.

For comparison, the following experiment was effected: According to the process disclosed in Japanese Patent Publication No. 7,133/1963, the above-mentioned intermediary material was thoroughly dried under reduced pressure at 70° C. and was then heated in air at 500° C. for 5 hours. Using 0.05 g. of the obtained product as the first component and 0.35 g. of triethylaluminum as the second component, ethylene was polymerized in exactly the same manner as above to obtain only 0.4 g. of polyethylene.

EXAMPLES 2–8

An intermediary material obtained in the same manner as in Example 1 was treated with various alcohols to prepare first components. The reaction apparatus and procedures employed in the alcohol treatment were the same as in Example 1. Using 0.05 g. of each first component thus prepared and 0.3 g. of aluminum sesquichloride, homopolymerization of ethylene was effected in a 1,000-cc. stainless steel autoclave provided with an electromagnetic stirrer. The operations and procedures were the same as in Example 1. Preparation conditions of first components, polymerization reaction conditions and yields are shown in Table 1.

TABLE 1

| Example Number | | 2 | 3 | 4 | 5 | 6 | 7 | 8 |
|---|---|---|---|---|---|---|---|---|
| Preparation of first component. | Intermediary material (g.) | 5.0 | 5.0 | 5.0 | 5.0 | 5.0 | 2.5 | 2.5 |
| | Alcohol (g.) | 2-ethyl-1-hexanol. | Hexadecanol | Benzyl-alcohol. | Phenol | Cyclo-hexanol. | Ethylene glycol. | Ethylene glycol monomethyl ether. |
| | | 13.2 | 24.2 | 10.9 | 9.5 | 10.1 | 6.2 | 7.6. |
| | Solvent (cc.) | Carbontetra-chloride. | Ethylacetate | Toluene | Benzene | Cyclo-hexane. | Methyl ethyl ketone. | Ethylene glycol dimethyl ether. |
| | | 200 | 250 | 200 | 200 | 250 | 200 | 150. |
| | Duration (hr.) | 12 | 8 | 12 | 12 | 12 | 8 | 8. |
| | Yield (g.) | 5.1 | 6.2 | 5.8 | 4.8 | 5.1 | 5.3 | 2.7. |
| Polymerization conditions. | Ethylene pressure (kg./cm.$^2$). | 20 | 6 | 20 | 20 | 20 | 6 | 6. |
| | Reaction temperature (° C.). | 70 | 60 | 70 | 70 | 70 | 60 | 60. |
| | Reaction time (hr.) | 1 | 2 | 2 | 2 | 2 | 5 | 2. |
| Resulting polymer | Yield (g.) | 46.8 | 20.4 | 50.8 | 20.2 | 29.0 | 26.3 | 19.3. |

EXAMPLES 9-14

An intermediary material obtained in the same manner as in Example 1 was treated with alcohols without solvent to prepare first components. The alcohol treatment was effected in the same manner as in Example 1, except that a 300-cc. flask was used as the reactor. In Example 1, a part of the reflux liquid was withdrawn, but in these examples, no such operation was effected. Using 0.05 g. of each first component and 0.3 g. of ethylaluminum dichloride, polymerization of ethylene was effected in the presence of hydrogen in a 1,000 cc. stainless steel autoclave. Hydrogen was initially charged up to a given amount and was not supplied thereafter. Ethylene was supplied as the reaction progressed and the reaction pressure of the whole system was constantly maintained. Polymerization reaction conditions and results obtained are shown in Table 2.

EXAMPLES 15-21

The same procedures as in Example 1 were effected, except that the second components, solvents and reaction temperatures were varied. The reactor employed was a stainless steel autoclave provided with an electromagnetic stirrer, and various solvents were used in amount of 250 cc. The feed amount of the first component was 0.02 g., and the charging procedures of catalysts and solvents were effected according to Example 1. After heating the reactor to a given temperature, ethylene was charged to a given pressure, and each experiment was effected under a constant pressure. Results obtained are shown in Table 3.

EXAMPLES 22-26

Using the first component prepared in Example 1, copolymerization of ethylene with other olefins was effected in the presence of hydrogen. The reactor employed was a 500-cc. autoclave provided with an electromagnetic stirrer. After charging into the autoclave 0.05 g. of the first component, 0.24 g. of ethylaluminum sesquichloride as the second component and 250 cc. of n-heptane as the solvent, the autoclave was heated to 70° C. and was charged with various olefin. Further, hydrogen and ethylene were charged to given pressures, respectively. As the reaction progressed, ethylene was supplied and the reaction was effected for a given time while constantly maintaining the total pressure. After-treatment operations of the resulting polymers were effected in the same manner as in Example 1. Results are shown in Table 4.

EXAMPLES 27-31

5.0 g. of an intermediary material prepared in the same manner as in Example 1 and 185 g. of n-butanol were heated in a 500-cc. flask. Immediately after reaching the boiling point, the mixture was concentrated to about one half within 1 hour. Thereafter, a reflux condenser was attached to the flask, and the reaction was effected with reflux for 12 hours. After cooling the flask, the content was taken out and was filtered-to obtain a blue residue and a black brown filtrate. The residue was dried with heating under reduced pressure. Yield 0.9 g. (Part I). The filtrate was divided into 4 equal portions, which were then subjected, respectively, to the following treatments:

i. Drying up:
   The first portion was distilled at normal pressure and was dried under reduced pressure to obtain a non-volatile portion. Yield 1.4 g. (Part II).

ii. Adding of water:
   The second portion was charged with 1.0 g. of water and the mixture was stirred at its boiling point for 4 hours. A deposited blue precipitate was separated by filtration

TABLE 2

| Example Number | | 9 | 10 | 11 | 12 | 13 | 14 |
|---|---|---|---|---|---|---|---|
| Preparation of first component | Intermediary material (g.) | 5.0 | 5.0 | 5.0 | 5.0 | 5.0 | 5.0 |
| | Alcohol (g.) | Methanol 16.2 | n-Propanol 15.2 | n-Butanol 18.7 | n-Pentanol 22.3 | (1) 22.3 | n-Octanol 33.0 |
| | Duration (hr.) | 12 | 12 | 12 | 12 | 12 | 12 |
| | Yield (g.) | 4.9 | 5.0 | 6.2 | 5.3 | 5.4 | 5.6 |
| Polymerization conditions | Hydrogen pressure (kg./cm.$^2$) | 9 | 9 | 9 | 5 | 5 | 9 |
| | Ethylene pressure (kg./cm.$^2$) | 12 | 12 | 12 | 6 | 6 | 6 |
| | Reaction temperature (° C.) | 70 | 70 | 70 | 70 | 70 | 70 |
| | Reaction time (hr.) | 2 | 2 | 2 | 3 | 3 | 3 |
| Resulting polymer | Yield (g.) | 11.0 | 37.9 | 64.5 | 42.7 | 33.9 | 11.4 |
| | Intrinsic viscosity (dl./g.) | 2.08 | 2.21 | 2.15 | 2.06 | 2.08 | 1.68 |
| | Density (g./cc.) | 0.9615 | 0.9611 | 0.9593 | 0.9604 | 0.9598 | 0.9596 |

[1] 3-methyl-1-butanol.

TABLE 3

| Example Number | | 15 | 16 | 17 | 18 | 19 | 20 | 21 |
|---|---|---|---|---|---|---|---|---|
| Polymerization conditions | Second component (g.) | Trimethylaluminum | Ethylaluminum dichloride plus aluminum chloride, equimolar mixture | Diethylaluminum bromide | Diethylaluminum iodide | Diisobutylaluminum hydride | Trihexylaluminum | Diethylaluminum ethoxide |
| | | 0.14 | 0.25 | 0.33 | 0.42 | 0.28 | 0.56 | 0.26 |
| | Solvent | Benzene | Tetrachloroethylene | Heptane | Heptane | Decaline | Cyclohexane | Tetraline |
| | Ethylene pressure (kg./cm.$^2$) | 10 | 5 | 5 | 5 | 5 | 6 | 6 |
| | Reaction temperature (° C.) | 70 | 60 | 60 | 60 | 150 | 150 | 150 |
| | Reaction time (hr.) | 3 | 2 | 2 | 2 | 3 | 3 | 3 |
| Resulting polymer | Yield (g.) | 11.7 | 27.4 | 21.1 | 17.2 | 9.5 | 7.9 | 7.8 |

TABLE 4

| Example Number | | 22 | 23 | 24 | 25 | 26 |
|---|---|---|---|---|---|---|
| Polymerization conditions | Olefin (g.) | | Propylene 2.1 | Butene-1 2.8 | Butadiene 1.1 | Dicyclopentadien 2.6 |
| | Hydrogen pressure (kg./cm.$^2$) | 0 | 4 | 5 | 3 | 3 |
| | Ethylene pressure (kg./cm.$^2$) | 4 | 4 | 5 | 3 | 3 |
| | | 16 | 16 | 15 | 17 | 17 |
| | Reaction time (hr.) | 1 | 3 | 2 | 5 | 5 |
| Resulting polymer | Yield (g.) | 32.7 | 34.3 | 31.9 | 29.5 | 37.2 |
| | Density (g./cc.) | 0.9611 | 0.9508 | 0.9551 | 0.9578 | 0.9566 |
| | Number of methyl group* (per 1,000 carbon atoms) | <1 | 8 | 5 | [1] 1 | [1] 1 |
| | Number of double bond* (per 1,000 carbon atoms) | <0.1 | 0.2 | 0.2 | 2.4 | 2.1 |

[1] About.
* According to infrared absorption spectrum analysis method.

and was dried with heating under reduced pressure. Yield 1.1 g. (Part III).

iii. Supporting on carrier:

The third portion was added to and thoroughly mixed with 20 g. of a pre-dried silica gel powder, and the mixture was subjected to distillation to remove volatiles. Yield 21.1 g. (Part IV).

iv. Adding of non-solvent:

The fourth portion was concentrated to about 1 cc. and was added to 150 cc. of n-heptane. After allowing the mixture to stand overnight, a deposited precipitate was separated by centrifugation and was dried under reduced pressure. Yield 1.2 g. (Part V).

Using the thus obtained first components, 0.3 g. of ethylaluminum sesquichloride and 500 cc. of n-heptane, ethylene was polymerized at 70° C. for 2 hours under a hydrogen pressure of 9 kg./cm.$^2$ and an ethylene pressure of 12 kg./cm.$^2$ to obtain the results shown in Table 5.

TABLE 5

| Example No. | 27 | 28 | 29 | 30 | 31 |
|---|---|---|---|---|---|
| First component | Part I | Part II | Part III | Part IV | Part V |
| (g.) | 0.05 | 0.05 | 0.05 | 0.25 | 0.05 |
| Resulting polymer yield (g.) | 44.1 | 31.6 | 59.8 | 35.5 | 30.9 |
| Intrinsic viscosity (dl./g.) | 2.51 | 1.91 | 2.47 | 2.45 | 2.12 |

EXAMPLE 32

In this example, the synthesis of first component was carried out at one stage by subjecting primary starting material without isolating said intermediary material.

0.91 g. of vanadium pentoxide, 0.98 g. of orthophosphoric acid(85 percent) and 37.1 g. of n-butanol were charged in a 200-cc. flask and were reacted for about 2 hours at a reaction temperature of 90°–100° C. Thereafter, the reaction mixture was further heated and the reaction was effected for 5 hours at the boiling point of the mixture, while using a reflux condenser, to form a bluish green precipitate. The precipitate was separated by filtration and was dried with heating under reduced pressure to obtain a first component. Yield 2.02 g. Using 0.05 g. of the thus obtained first component, 0.3 g. of ethylaluminum dichloride and 500 cc. of n-heptane, polymerization of ethylene was effected with stirring in a 1,000-cc. autoclave at a reaction temperature of 70° C. for 3 hours under a hydrogen pressure of 9 kg./cm.$^2$ and an ethylene pressure of 12 kg./cm.$^2$ to obtain 37.2 g. of solid polyethylene. The intrinsic viscosity of said polyethylene was 2.7.

EXAMPLE 33

Using the first component prepared in Example 1, ethylene was copolymerized with propylene in a relatively large amount based on the amount of ethylene. The reactor employed was a 1000 cc. autoclave. After charging into the autoclave 0.05 g. of the first component, 0.37 g. of ethylaluminum sesquichloride as second component and 500 cc. of n-heptane as solvent, the autoclave was heated to 70° C. and propylene was charged to a pressure of 7 kg./cm$^2$. Thereafter, hydrogen was charged to a pressure of 2 kg./cm.$^2$, and further ethylene to a pressure of 2.5 kg./cm$^2$. As the reaction progressed, ethylene was supplied so that the total pressure became constant. After 2 hours, unreacted monomers were excluded and then the content of the autoclave was taken out. The content was transferred to a separating funnel and was thoroughly treated with a 10 percent aqueous hydrochloric acid solution. After thoroughly washing the reaction mixture with water, a n-heptane solution part was taken out and was added into about 5,000 cc. of methanol. A deposited substance was separated by filtration, was thoroughly washed with methanol and was then dried at 50° C. under a reduced pressure of 20 mmHg. The yield of the product was 10.4 g. As the result of analysis according to infrared absorption spectrum, the propylene unit content of the product was 41 mol percent.

What is claimed is:

1. A process for producing a homopolymer or copolymer of ethylene, characterized in that ethylene, either alone or together with another unsaturated hydrocarbon, is contacted in a solvent in the presence or absence of hydrogen at a temperature of 0° to 300° C., at an ethylene partial pressure of 0.1 to 200 kg./cm$^2$, with a two-component catalyst composed of 1. a first component which is a substance obtained by treating an intermediary material with an alcohol, said intermediary material having been formed by the reaction of a vanadium compound with an unsubstituted phosphoric acid, the amount of said alcohol being 0.1 to 1,000 parts by weight per part by weight of said intermediary material, the vanadium to phosphorous atomic ratio of said first component falling within the limits of 2:1 to 1:2 and said first component containing the vanadium-oxygen-phosphorous linkage said first component being substantially freed of water and alcohol; and 2 a second component having the formula

wherein

R is a hydrocarbon group having 1–8 carbon atoms;

X is halogen, alkoxy or hydrogen; and $n$ is a positive number not greater than 3, which may be used alone or in admixture with an aluminum halide, the amount of said first component being 0.001 to 10 parts by weight per 1,000 parts by weight of solvent and the amount of said second component being 0.01 to 100 parts by weight per 1,000 parts by weight of solvent.

2. The process of claim 1, wherein said phosphoric acid is orthophosphoric acid.

3. A process according to claim 1, wherein the said treatment with an alcohol is carried out by contacting the said intermediary material with an alcohol in the presence or absence of a medium at a temperature ranging from 0° to 250° C. for 10 minutes to 100 hours.

4. A process according to claim 1, wherein the said treatment with an alcohol is carried out while removing the by-products having lower boiling point.

5. A process according to claim 1, wherein the said unsaturated hydrocarbon is at least one member selected from the group consisting of olefins and diolefins.

6. A process according to claim 1, wherein the said alcohol is a member selected from the group consisting of aliphatic, alicyclic and aromatic alcohols, and phenols.

7. A process according to claim 1, wherein the said first component is synthesized by reacting in a single step a vanadium compound, an unsubstituted phosphoric acid and an alcohol, without the isolation of the said intermediary material.

8. A process according to claim 1, wherein said first component is obtained by i. removing volatiles from the treated mixture and drying the residue, or ii. subjecting the treated mixture to filtration or centrifuge to divide the same into a solid portion and a solution portion and drying the solid portion, and removing volatiles from the solution portion and drying the residue, or iii. adding water to the solution portion obtained in (ii) to form precipitate and then drying the precipitate, or iv. adding non-solvent to the solution portion obtained in (ii) to form precipitate and then drying the precipitate, or v. incorporating a carrier into the solution portion obtained in (ii) and then drying the incorporated carrier.

9. A two component catalyst for ethylene polymerization comprising 1. a first component which is a substance obtained by treating an intermediary material with an alcohol, said intermediary material having been formed by the reaction of a vanadium compound with an unsubstituted phosphoric acid, the amount of said alcohol being 0.1 to 1,000 parts by weight per part by weight of said intermediary material, the vanadium to phosphorous atomic ratio of said first component falling within the limits of 2:1 to 1:2 and said first component containing the vanadium-oxygenphosphorous linkage said first component being substantially freed of water and alcohol; and uncombined 2. a second component having the formula $$R_nAlX_3^-{}_n$$

wherein

R is a hydrocarbon group having 1–8 carbon atoms;

X is halogen, alkoxy, or hydrogen; and $n$ is a positive number not greater than 3, which may be used alone or in admixture with an aluminum halide the relative weight proportions of said first component to said second component being 0.001 to 10: 0.01 to 100.

10. The catalyst of claim 9, wherein said phosphoric acid is orthophosphoric acid.

11. A catalyst for ethylene polymerization and copolymerization according to claim 9, wherein the said treatment with an alcohol is carried out by contacting the said intermediary material with an alcohol in the presence or absence of a medium at a temperature ranging from 0° to 250° C. for 10 minutes to 100 hours.

12. An improved ethylene polymerization catalyst of increased activity having a first component containing vanadium and phosphorous and a second component containing an organo aluminum compound of the formula $$R_nAlX_{3-n}$$

wherein

R is a hydrocarbon group having 1–8 carbon atoms;

X is halogen, alkoxy or hydrogen; and $n$ is a positive number not greater than 3, which may be used alone or in admixture with an aluminum halide, characterized in that the said first component is obtained by treating an intermediary material formed by the reaction of a vanadium compound with an unsubstituted phosphoric acid with an alcohol, the amount of said alcohol being 0.1 to 1,000 parts by weight per part by weight of said intermediary material, the vanadium to phosphorous atomic ratio of said first component falling within the limits of 2:1 to 1:2 and said first component containing the vanadium-oxygen-phosphorous linkage, and said first component being substantially freed of water and uncombined alcohol.

13. The improved ethylene polymerization catalyst of claim 12 wherein said phosphoric acid is orthophosphoric acid.

14. An improvement according to claim 12 wherein the said treatment with an alcohol is carried out by contacting the said intermediary material with an alcohol in the presence or absence of a medium at a temperature ranging from 0° to 250° C. for 10 minutes to 100 hours.

15. A process according to claim 8 wherein said first component is obtained by subjecting the treated mixture to filtration or centrifuge to divide the same into a solid portion and a solution portion and drying the solid portion, and removing volatiles from the solution portion and drying the residue.

16. A process according to claim 15 wherein said first component is obtained by adding water to said solution portion to form a precipitate and then drying the precipitate.

17. A process according to claim 15 wherein said first component is obtained by adding non-solvent to said solution portion to form a precipitate and then drying the precipitate.

18. A process according to claim 15 wherein said first component is obtained by incorporating a carrier into said solution portion and then drying the incorporated carrier.

* * * * *